(12) United States Patent
Lee

(10) Patent No.: US 8,462,295 B2
(45) Date of Patent: Jun. 11, 2013

(54) DISPLAY DEVICE

(75) Inventor: Jung Mok Lee, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 288 days.

(21) Appl. No.: 12/679,145

(22) PCT Filed: Oct. 22, 2008

(86) PCT No.: PCT/KR2008/006254
§ 371 (c)(1),
(2), (4) Date: Mar. 19, 2010

(87) PCT Pub. No.: WO2009/054677
PCT Pub. Date: Apr. 30, 2009

(65) Prior Publication Data
US 2010/0253878 A1   Oct. 7, 2010

(30) Foreign Application Priority Data
Oct. 22, 2007  (KR) .................. 10-2007-0106064

(51) Int. Cl.
*G02F 1/1335* (2006.01)
*G02B 6/10* (2006.01)

(52) U.S. Cl.
USPC ............................... 349/65; 349/62; 385/146

(58) Field of Classification Search
USPC ....................... 349/62–65; 385/146
See application file for complete search history.

(56) References Cited

U.S. PATENT DOCUMENTS

| 7,075,597 | B2 * | 7/2006 | Wen et al. | 349/74 |
| 7,165,865 | B2 * | 1/2007 | Cho | 362/253 |
| 7,889,288 | B2 * | 2/2011 | Choi | 349/61 |
| 2003/0043315 | A1 | 3/2003 | Umemoto et al. | |
| 2005/0041176 | A1 | 2/2005 | Kim et al. | |
| 2007/0171332 | A1 * | 7/2007 | Suzuki | 349/74 |

FOREIGN PATENT DOCUMENTS

| JP | 2005-024627 A | 1/2005 |
| JP | 2007-199157 A | 8/2007 |
| JP | 2007-220464 A | 8/2007 |
| KR | 10-2007-0059526 A | 6/2007 |

* cited by examiner

*Primary Examiner* — Uyen Chau N Le
*Assistant Examiner* — Chris Chu
(74) *Attorney, Agent, or Firm* — Birch, Stewart, Kolasch & Birch, LLP

(57) ABSTRACT

Provided is a display device. The display device comprises: a liquid crystal panel; a first light guide plate disposed above the liquid crystal panel; a second light guide plate disposed below the liquid crystal panel; a light guide member emitting light incident toward the first light guide plate and the second light guide plate; and a light source disposed on a side of the light guide member. Because of the light guide member, the sizes of the light guide plates and the light source are not limited to each other and then disposed. Additionally, the display device uses one light source to realize two screens.

9 Claims, 4 Drawing Sheets

DISPLAY DEVICE

CROSS-REFERENCE TO RELATED APPLICATIONS

This application is the U.S. national stage application of International Patent Application No. PCT/KR2008/006254, filed Oct. 22, 2008, which claims priority to Korean Application No. 10-2007-0106064, filed Oct. 22, 2007, the disclosures of each of which are incorporated herein by reference in their entirety.

TECHNICAL FIELD

Embodiments relate to a display device.

BACKGROUND ART

As an information-oriented society has been developed, a demand for a display device is increased in various forms. For this, diverse flat display devices such as Liquid Crystal Display (LCD), Plasma Display Panel (PDP), Electro Luminescent Display (ELD) are currently used.

Especially, among those display devices, a display device having a dual screen where its front and rear screens display images is extensively used.

DISCLOSURE OF INVENTION

Technical Problem

Embodiments provide a display device having high brightness, brightness uniformity, slimness, and low-power consumption.

Technical Solution

In an embodiment, a display device comprises: a liquid crystal panel; a first light guide plate disposed on the liquid crystal panel; a second light guide plate disposed under the liquid crystal panel; a light guide member emitting light incident toward the first light guide plate and the second light guide plate; and a light source disposed on a side of the light guide member.

In an embodiment, a display device comprises: a reflecting plate; a first liquid crystal panel disposed on the reflecting plate; a second liquid crystal panel disposed under the reflecting plate; first light guide plate disposed on the first liquid crystal panel; a second light guide plate disposed under the second liquid crystal panel; a light guide member including a first outgoing side toward the first light guide plate and a second outgoing side toward the second light guide plate; and a light source disposed on a side of the light guide member.

In an embodiment, a display device comprises: a light source generating light; a light guide member receiving the light and emitting the received light through a first outgoing side and a second outgoing side; a first light guide plate receiving the light emitted through the first outgoing side; a second light guide plate receiving the light emitted through the second outgoing side; and a display panel interposed between the first light guide plate and the second light guide plate.

Advantageous Effects

According to a display device of an embodiment, light generated from a light source is diffused firstly by a light guide member and then is diffused secondly by light guide plates. Therefore, high brightness uniformity can be achieved.

Additionally, since the light source is disposed on the side of the light guide member, the thickness of the light source may be the sum of the thicknesses of a liquid crystal panel, a first light guide plate, and a second light guide plate. That is, the size of the light source is not limited the thicknesses of the light guide plates.

Accordingly, a display device according to an embodiment can use the light source whose thickness is greater than those of the first light guide plate and the second light guide plate. Therefore, the light sources can emit light having high brightness.

Therefore, a display device according to an embodiment can realize high brightness.

Additionally, the thicknesses of the first light guide plate and the second light guide plate are not limited to the size of the light source and may be thin.

Accordingly, a display device according to an embodiment can be realized slim.

Additionally, one light source emits light to the first light guide plate and the second light guide plate.

Accordingly, a display device according to an embodiment can be driven by one light source and thus has low power consumption.

BEST MODE FOR CARRYING OUT THE INVENTION

In the following description, it will be understood that when a part such as a member, a pattern, a lens, a surface and a groove is referred to as being 'on' another part, it can be directly on the another part, or intervening parts may also be present. Further, it will be understood that when a part is referred to as being 'under' another part, it can be directly under the another layer, and one or more intervening layers may also be present.

Figure 1:
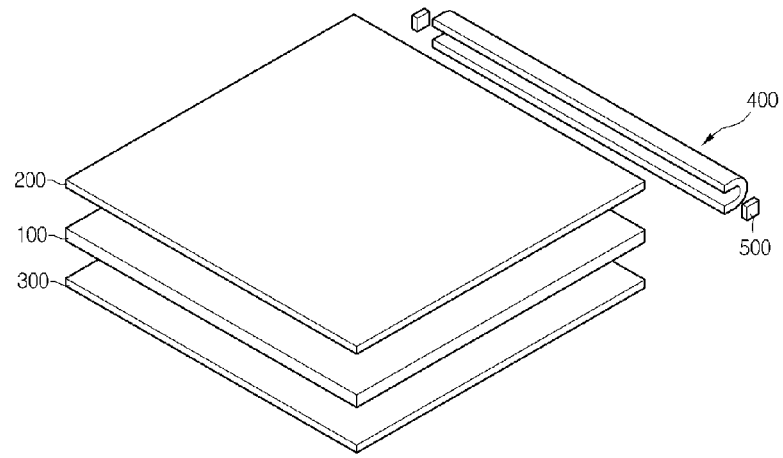
FIG. 1 is an exploded perspective view of a liquid crystal display device according to a first embodiment.
Figure 2:
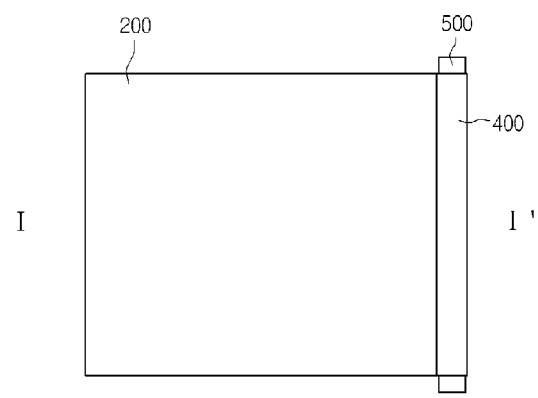
FIG. 2 is a plan view of the liquid crystal display device according to the first embodiment.
Figure 3:
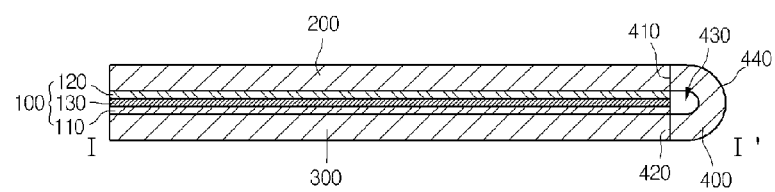
FIG. 3 is a cross-sectional view taken along a line I-I' of FIG. 2.

FIG. 1 is an exploded perspective view of a liquid crystal display device according to a first embodiment. FIG. 2 is a plan view of the liquid crystal display device according to the first embodiment. FIG. 3 is a cross-sectional view taken along a line I-I' of FIG. 2. FIGS. 4 to 10 are perspective views of a light guide member.

Referring to FIGS. 1 to 3, the liquid crystal display device comprises a liquid crystal panel 100, a first light guide plate 200, a second light guide plate 300, a light guide member 400, and a light source 500.

The liquid crystal panel 100 has a plate form, for example. The liquid crystal panel 100 controls the intensity of transmitted light by each pixel (i.e., a unit for displaying an image) in order to display an image. The liquid crystal panel 100 includes a TFT substrate 110, a color filter substrate 120, and a liquid crystal layer 130. The liquid crystal panel 100 includes polarizing filters (not shown) below the TFT substrate 110 and above the color filter substrate 120.

The TFT substrate 110 receives an electrical signal from an electrically connected main substrate to form an electric field by each pixel. For example, the TFT substrate 110 includes gate lines, data lines intersecting the gate lines, thin film transistors (TFTs), and pixel electrodes.

Through the gate wiring, a gate signal is applied to the TFT. The TFT applies a data signal, applied through the data wiring, to the pixel electrode.

An electric field occurs between a pixel electrode to which the data signal is applied and a common electrode to which a common voltage is applied.

For example, one TFT and one pixel electrode may be disposed in each pixel.

The color filter substrate 120 is disposed facing the TFT substrate 110. For example, the color filter substrate 120 includes a plurality of color filters. The color filters are red color filters, green color filters, and blue color filters, for example.

For example, the color filters may be disposed in each pixel, and realize an image having each color by filtering a white light transmitted through each pixel.

The liquid crystal layer 130 is interposed between the TFT substrate 110 and the color filter substrate 120. The liquid crystal layer 130 includes liquid crystal. The liquid crystal layer 130 adjusts a path of light passing through each pixel.

The liquid crystal in the liquid crystal layer 130 is aligned by each pixel due to an electric field formed between the common electrode and the pixel electrode. Therefore, the path of light passing through the liquid crystal layer 130 is adjusted.

By the liquid crystal layer 130 and the polarizing filters, the intensity of light passing through the liquid crystal panel 100 is adjusted by a pixel unit.

The first light guide plate 200 is disposed on the liquid crystal panel 100. To be more specific, the first light guide plate 200 is disposed on the color filter substrate 120. The first light guide plate 200 has a plate form and may be disposed spaced from the liquid crystal panel 100.

The first light guide plate 200 receives and diffuses the light generated from the light source 500 and emits the diffused light toward the liquid crystal panel 100. The first light guide plate 200 may be formed of poly methyl methacrylate (PMMA), acrylonitrile styrene (AS), polystyrene (PS), polycarbonate (PC), polyethersulfone (PES), polyamide (PA), polyesterimide (PEI) and polymethylpentene (PMP).

The second light guide plate 200 is disposed below the liquid crystal panel 100. To be more specific, the second light guide plate 200 is disposed below the TFT substrate 110. That is, the second light guide plate 300 faces the first light guide plate 200, with the liquid crystal panel 100 interposed therebetween.

The second light guide plate 300 receives and diffuses the light generated from the light source 500 and then emits the diffused light toward the liquid crystal panel 100. The second light guide plate 300 may be formed of the same material as the first light guide plate 200.

The light guide member 400 is disposed on the sides of the liquid crystal panel 100, the first light guide plate 200, and the second light guide plate 300. The light guide member 400 receives light generated from the light source 500 and then emits the generated light toward the first light guide plate 200 and the second light guide plate 300.

The light guide member 400 may be formed of the same material as the first light guide plate 200. The light guide member 400 includes a first outgoing side 410 and a second outgoing side 420.

The first outgoing side 410 faces the first light guide plate 200. In more detail, the first outgoing side 410 faces the side of the first light guide plate 200. For example, the first outgoing side 410 and the side of the first light guide plate 200 may contact each other or are spaced apart from each other.

Moreover, the side of the first light guide plate 200 may have a form that corresponds to the form of the first outgoing side 410.

The second outgoing side 420 faces the second light guide plate 300. In more detail, the second outgoing side 420 faces the side of the second light guide plate 300. For example, the second outgoing side 420 and the side of the second light guide plate 300 may contact each other or are spaced apart from each other.

Moreover, the side of the second light guide plate 300 may have a form that corresponds to the form of the second outgoing side 420.

A groove 430 is formed between the first outgoing side 410 and the second outgoing side 420.

The light guide member 400 has a curved surface facing the side where the groove 430 is formed. That is, as illustrated in FIG. 3, the section of the light guide member 400 may have a semi-donut form.

The light guide member 400 totally reflects an incident light through the curved surface, and then emits the light through the first outgoing side 410 and the second outing side 420.

Unlike this, the light guide member 400 may have a plane facing the side where the groove 430 is formed.

The light guide member 400 and the first light guide plate 200 may be integrated into one body. Additionally, the light guide member 400 and the second light guide plate 300 may be integrated into one body. Moreover, the light guide member 400, the first light guide plate 200, and the second light plate 300 may be integrated into one body.

When the light guide member 400 and the first light guide plate 200 and/or the second light guide plate 300 are integrated into one body, the loss of light incident from the light guide member 400 into the first light guide plate 200 and the second plate guide plate 300 can be reduced.

Accordingly, when the light guide member 400 and the first light guide plate 200 and/or the second light guide plate 300 are integrated into one body, the brightness of a liquid crystal display device may be further improved.

The light source 500 is disposed on the side of the light guide member 400. For example, the light source 500 is disposed on the end of the light guide member 400, and two light sources 500 may be disposed on the both ends of the light guide member 400. That is, it may be disposed on the side where the first outgoing side 410 and the second outgoing side 420 intersect.

Unlike this, the light source 500 may be disposed on the surface of the light guide members 400 that first outgoing side 410 or the second outgoing side 420 faces.

The light source 500 may be a Light Emitting Diode (LED), a Cold Cathode Fluorescence Lamp (CCFL), or an External Electrode Fluorescent Lamp (EEFL). The light source 500 emits light.

Light generated from the light source 500 is incident to the light guide member 400, and is diffused by the light guide member 400 through total reflection. Then, the light is emitted toward the first light guide plate 200 and the second light guide plate 300.

The light emitted toward the first light guide plate 200 is diffused by the first light guide plate 200 through total reflection, and then is emitted downwardly toward the liquid crystal panel 100. The light emitted from the first light guide plate 200 to the liquid crystal panel 100 passes through the liquid crystal panel 100.

At this point, the liquid crystal panel 100 adjusts the intensity of the penetrated light by each pixel in order to display an image at a bottom surface of the liquid crystal panel 100.

Additionally, the light emitted toward the second light guide plate 300 is diffused in the second light guide plate 300 through total reflections, and then is emitted upwardly toward the liquid crystal panel 100. The light emitted from the second light guide plate 300 to the liquid crystal panel 100 passes through the liquid crystal panel 100.

At this point, the liquid crystal panel 100 adjusts the intensity of the transmitted light by each pixel in order to display an image on a top surface of the liquid crystal panel 100.

The liquid crystal display device according to an embodiment can display images on the top surface and the bottom surface of the liquid crystal panel 100.

In the liquid crystal display device according to this embodiment, light emitted from the light source 500 is diffused firstly at the light guide member 400, and then is diffused secondly at the first light guide plate 200 and the second light guide plate 300. Therefore, brightness uniformity is improved.

That is, if compared to a case where the light guide member 400 is not included and each light source 500 is disposed on the side of the first light guide plate 200 and the side of the second light guide plate 300, the liquid crystal display device according to this embodiment has higher brightness uniformity.

Additionally, since the light source 500 is disposed on the side of the light guide member 400 in the liquid crystal display device according to the embodiment, the thickness of the light source 500 may be the same as the sum of the thicknesses of the first light guide plate 200 and the second light guide plate 300.

That is, the thickness of the light source 500 is not limited to the thicknesses of the first light guide plate 200 and the second light guide plate 300.

Accordingly, the liquid crystal display device according to this embodiment may include a light source having a relatively large size and high output. Accordingly, high brightness can be realized.

Moreover, the thicknesses of the first and second light guide plates 200 and 300 may be adjusted regardless of the size of the light source 500. Accordingly, the first and second light guide plates 200 and 300 may have thinner thicknesses, and the liquid crystal display device according to the embodiment can be slimmer.

Additionally, the liquid crystal display device according to the embodiment uses one light source to emit light toward the first light guide plate 200 and the second light guide plate 300. Thus, an image can be displayed. Accordingly, the liquid display device according to the embodiment may reduce power consumption.

Figure 4:
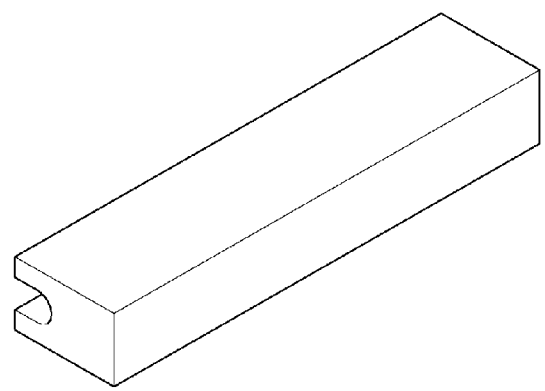
FIGS. 4 to 10 are perspective views of a light guide member.
Figure 5:
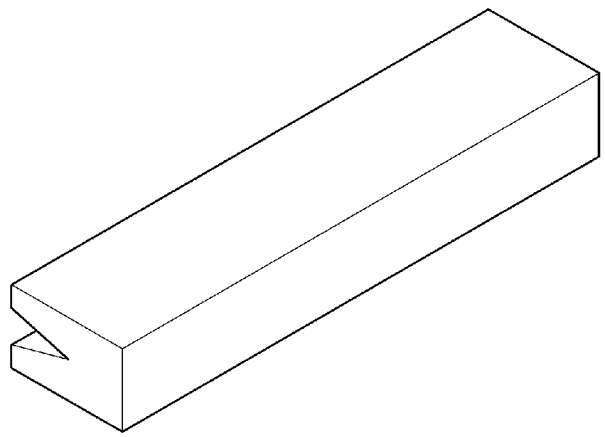

Referring to FIGS. 4 and 5, the section of the groove formed in the light guide member may have a U-shape or V-shape.

Figure 6:
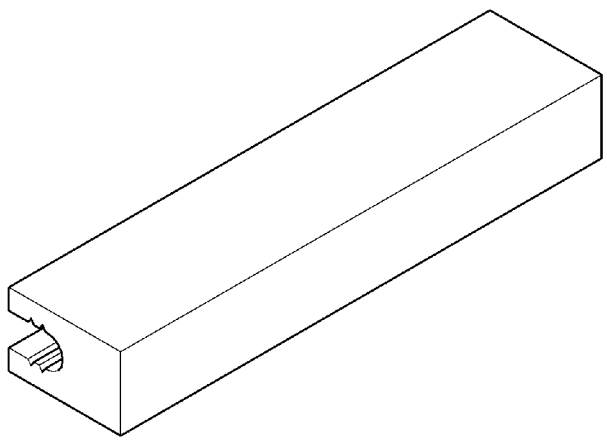

Referring to FIG. 6, a sub-groove is formed in the groove of the light guide member. The sub-groove may be formed in plurality, for example.

The section of the sub-groove may have a U-shape or V-shape. By the sub groove, the light emitted from the light source 500 is diffused more effectively in a direction where the sub-groove is formed.

Figure 7:
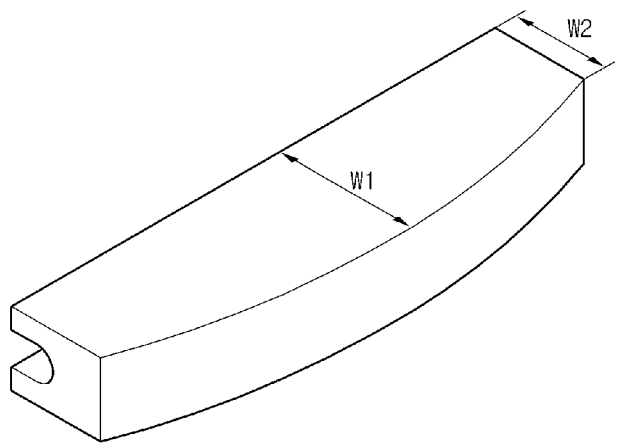

Referring to FIG. 7, the side facing the first outgoing side and the second outgoing side of the light guide member is convex. For example, when seen from the above, the width W1 of the center of the light guide member is greater than the width W2 of both ends.

The light guide member can diffuse an incident light more uniformly.

Figure 8:
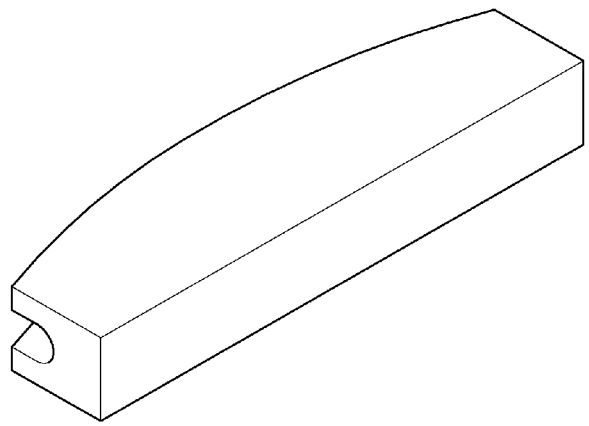

Referring to FIG. 8, the first outgoing side and the second outgoing side of the light guide member is convex.

At this point, the side of the first light guide plate 200 facing the first outgoing side may be concave corresponding to the first outgoing side. Additionally, the side of the second light guide plate 300 facing the second outgoing side may be concave corresponding to the second outgoing side.

The light guide member diffuses an incident light more uniformly.

Figure 9:
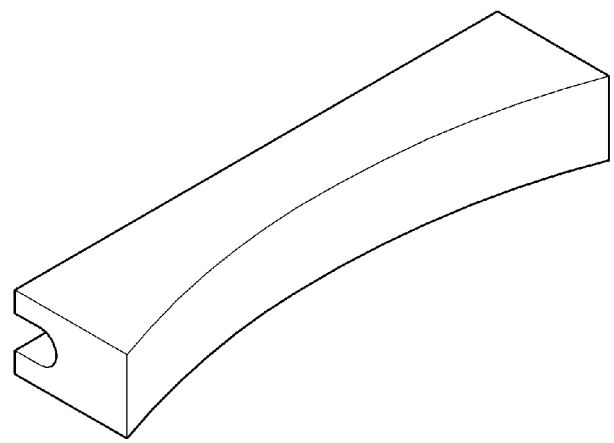

Referring to FIG. 9, the light guide member includes a concave side facing the first outgoing side and the second outgoing side.

Figure 10:
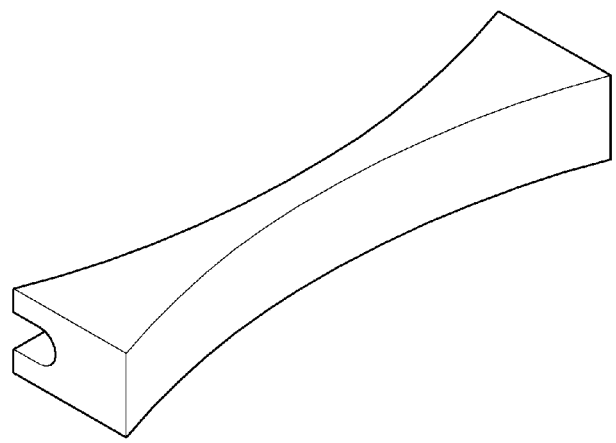

Referring to FIG. 10, the light guide member includes a concave first outgoing side and a concave second outgoing side, and includes a concave side facing the first outgoing side and the second outgoing side.

At this point, the side of the first light guide plate 200, facing the first outgoing side, may be convex corresponding to the first outgoing side, and the side of the second light guide plate 300, facing the second outgoing side, may be convex corresponding to the second outgoing side.

Figure 11:
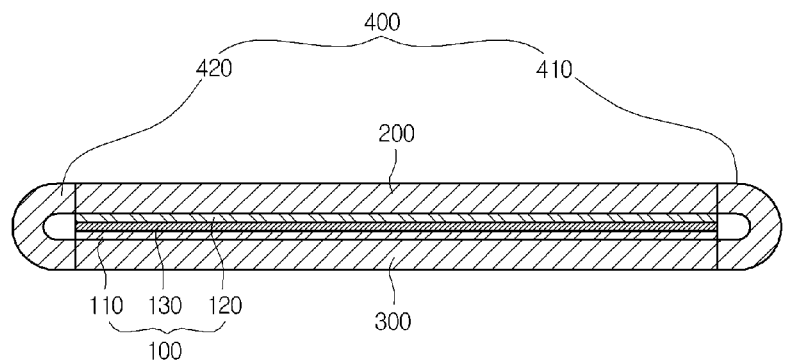
FIG. 11 is a cross-sectional view of a liquid crystal display device according to a second embodiment.

FIG. 11 is a cross-sectional view of a liquid crystal display device according to a second embodiment. This embodiment refers to the above-mentioned embodiment and a light guide member and a light source will be described additionally.

Referring to FIG. 11, a light guide member 400 includes a first light guide member 410 and a second light guide member 420. The first light guide member 410 and the second light guide member 420 face each other, interposing a liquid crystal panel 100, a first light guide plate 200, and a second light guide plate 300 therebetween.

Additionally, each light source is disposed on the side of the first light guide member 410 and the side of the second light guide member 420. For example, one or a plurality of the light sources may be disposed on the side of the first light guide member 410 and the side of the second light guide member 420.

In the liquid crystal display device according to this embodiment, since light is emitted toward the facing both sides of the first light guide plate 200 and second light guide plate 300, brightness and brightness uniformity are improved.

Accordingly, compared to the liquid crystal display device according to the previous embodiment, this embodiment realizes more high brightness and brightness uniformity.

Figure 12:
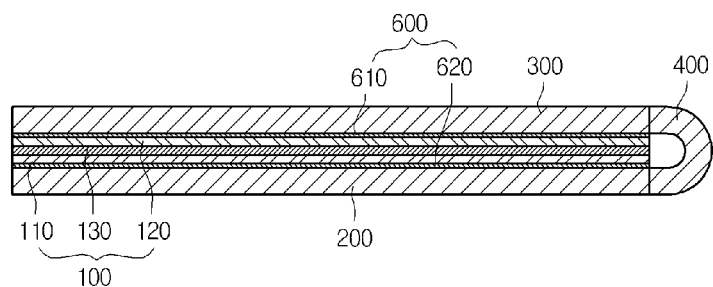
FIG. 12 is a cross-sectional view of a liquid crystal display device according to a third embodiment.

FIG. 12 is a cross-sectional view of a liquid crystal display device according to a third embodiment. This embodiment refers to the above-mentioned embodiments, and a damping member will be described additionally.

Referring to FIG. 12, the liquid crystal display device includes a damping member 600. The damping member 600 has elasticity and adhesiveness. The damping member 600 may be formed of acrylic resin or urethane resin. The damping member 600 includes a first damping member 610 and a second damping member 620.

The first damping member 610 is interposed between a first light guide plate 200 and a liquid crystal panel 100. The first damping member 610 is attached to the first light guide plate 200 and the liquid crystal panel 100. Additionally, the first damping member 610 adheres closely to the first light guide plate 200 and the liquid crystal panel 100, for example.

The second damping member 620 is interposed between a second light guide plate 300 and the liquid crystal panel 100. The second damping member 620 is attached to the second light guide plate 300 and the liquid crystal panel 100. Additionally, the second damping member 620 adheres closely to the second light guide plate 200 and the liquid crystal panel 100, for example.

By the damping member 600, the first light guide plate 200 and the second light guide plate 300 are fixed to the liquid crystal panel 100. Additionally, physical impact applied to the first light guide plate 200 and the second light guide plate 300 is absorbed by the damping member 600.

The first damping member 610 adheres closely to the first light guide plate 200 and the liquid crystal panel 100, and the second damping member 620 adheres closely to the second light guide plate 300 and the liquid crystal panel 100. Accordingly, no air layer exist between the first light guide plate 200 and the liquid crystal panel 100 and between the second light guide plate 300 and the liquid crystal panel 100.

Accordingly, the liquid crystal display device according to this embodiment realizes more improved image quality compared to the above mentioned embodiments.

Figure 13:
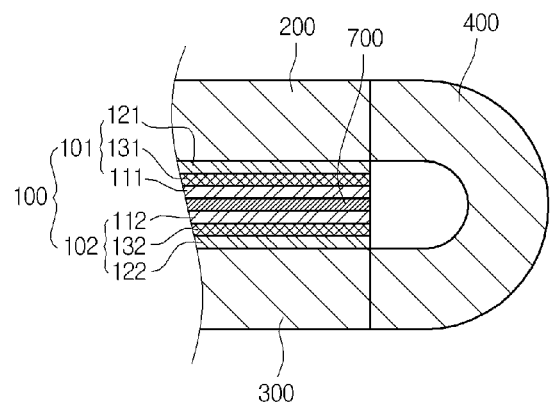
FIG. 13 is a cross-sectional view of a liquid crystal display device according to a fourth embodiment.

FIG. 13 is a cross-sectional view of a liquid crystal display device according to a fourth embodiment. This embodiment refers to the above-mentioned embodiments, and a liquid crystal panel and a reflecting plate will be described additionally.

Referring to FIG. 13, a liquid crystal display device includes a reflecting plate 700, and a liquid crystal panel 100 includes a first liquid crystal panel 101 and a second liquid crystal panel 102.

The reflecting plate 700 is interposed between the first liquid crystal panel 101 and the second liquid crystal panel 102. The reflecting plate 700 upwardly reflects light passing through the first liquid crystal panel 101 and downwardly reflects light pasting through the second liquid crystal panel 102.

The first liquid crystal panel 101 is disposed above the reflecting plate 700, and the second liquid crystal panel 102 is disposed below the reflecting plate 700. That is, the first and second liquid crystal panels 101 and 102 faces each other, having the reflecting plate 700 therebetween.

That is, the first liquid crystal panel 101 is interposed between the first light guide plate 200 and the reflecting plate 700, and the second liquid crystal panel 102 is interposed between the second light guide plate 300 and the reflecting plate 700.

The first liquid crystal panel 101 includes a first TFT substrate 111, a color filter substrate 121, and a first liquid crystal layer 131.

The first TFT substrate 111 is disposed on the reflecting plate 700, and the first color filter substrate 121 is spaced from and disposed on the first TFT substrate 111. The first liquid crystal layer 131 is interposed between the first color filter substrate 121 and the first TFT substrate 111.

The second liquid crystal panel 102 includes a second TFT substrate 112, a second color filter substrate 122, and a second liquid crystal layer 132.

The second TFT substrate 112 is disposed below the reflecting plate 700, and the second color filter substrate 122 is spaced from and disposed below the second TFT substrate 112. The second liquid crystal layer 132 is interposed between the second color filter substrate 122 and the second TFT substrate 112.

The light incident to the first light guide plate 200 is emitted toward the first liquid crystal panel 101 and is upwardly reflected again by the reflecting plate 700 through the first liquid crystal panel 101. Next, the reflected light passes through the first liquid crystal panel 101.

At this point, the first liquid crystal panel 101 adjusts the intensity of the transmitted light by each pixel in order to display an image on a top surface of the first liquid crystal panel 101.

The light incident to the second light guide plate 300 is emitted toward the second liquid crystal panel 102 and then is downwardly reflected again by the reflecting plate 700 through the second liquid crystal panel 102. The reflected light passes through the second liquid crystal panel 102.

At this point, the second liquid crystal panel 102 adjusts the intensity of the transmitted light by each pixel in order to display an image on a bottom surface of the second liquid crystal panel 102.

Likewise, the liquid crystal display device according to this embodiment displays images on the top surface of the first liquid crystal panel 101 and the bottom surface of the second liquid crystal panel 102.

Accordingly, the liquid crystal display device according to this embodiment can display respective images on the two surfaces.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

Liquid crystal display devices according to the embodiments are used in a display field.

The invention claimed is:

1. A display device comprising:
   a liquid crystal panel;
   a first light guide plate disposed on the liquid crystal panel;
   a second light guide plate disposed under the liquid crystal panel;
   a light guide member emitting light incident towards the first light guide plate and the second light guide plate; and
   a light source disposed on a side of the light guide member,
   wherein the light guide member includes a first outgoing side disposed towards the first light guide plate and a second outgoing side disposed towards the second light guide plate,
   wherein the light guide member is bent such that the first outgoing side is contacted with an incident surface of the first light guide plate and the second outgoing side is contacted with an incident surface of the second light guide plate,
   wherein a first groove of the light guide member is formed between the first outgoing side and the second outgoing side, wherein the light source includes a first light source and a second light source facing each other, the first light source and the second light source being disposed on lateral sides of the light guide member, wherein the light guide member includes second grooves formed at an inner surface of the light guide member in the first groove, and wherein the second grooves are parallel to a side of the liquid crystal panel corresponding to the light guide member.

2. The display device according to claim 1, wherein the light guide member has a convex surface or a concave surface.

3. The display device according to claim 1, wherein at least one of the first light guide plate and the second light guide plate is integrated with the light guide member.

4. The display device according to claim 1, wherein the light guide member comprises a first light guide member and a second light guide member facing each other, the first light guide plate and the second light guide plate being disposed therebetween.

5. The display device according to claim 1, further comprising a damping member, the damping member being disposed at least one of between the first light guide plate and the liquid crystal panel and between the second light guide plate and the liquid crystal panel.

6. A display device comprising:
a reflecting plate;
a first liquid crystal panel disposed on the reflecting plate;
a second liquid crystal panel disposed under the reflecting plate;
a first light guide plate disposed on the first liquid crystal panel;
a second light guide plate disposed under the second liquid crystal panel;
a light guide member including a first outgoing side disposed towards the first light guide plate and a second outgoing side disposed towards the second light guide plate; and
a light source disposed on a side of the light guide member, wherein the light guide member is bent such that the first outgoing side is contacted with an incident surface of the first light guide plate and the second outgoing side is contacted with an incident surface of the second light guide plate, wherein a first groove of the light guide member is formed between the first outgoing side and the second outgoing side, wherein the light source includes a first light source and a second light source facing each other, the first light source and the second light source being disposed on lateral sides of the light guide member, wherein the light guide member includes second grooves formed at an inner surface of the light guide member in the first groove, and wherein the second grooves are parallel to a side of the liquid crystal panel corresponding to the light guide member.

7. The display device according to claim 6, wherein the light guide member comprises a second groove formed at an inner side of the first groove.

8. The display device according to claim 6, wherein the light guide member has a convex surface or a concave surface.

9. The display device according to claim 6, wherein at least one of the first light guide plate and the second light guide plate is integrated with the light guide member.

* * * * *